(12) United States Patent
Jin et al.

(10) Patent No.: US 6,959,044 B1
(45) Date of Patent: Oct. 25, 2005

(54) DYNAMIC GOP SYSTEM AND METHOD FOR DIGITAL VIDEO ENCODING

(75) Inventors: Luojun Jin, Waterloo (CA); Lowell Winger, Waterloo (CA); Guy Cote, Elora (CA)

(73) Assignee: Cisco Systems Canada Co., Halifax (CA)

( * ) Notice: Subject to any disclaimer, the term of this patent is extended or adjusted under 35 U.S.C. 154(b) by 635 days.

(21) Appl. No.: 09/935,140

(22) Filed: Aug. 21, 2001

(51) Int. Cl.$^7$ .............................................. H04N 7/12
(52) U.S. Cl. ............................... 375/240.12; 348/699
(58) Field of Search ............................ 348/699, 700, 348/701, 412.1, 415.1, 722; 382/173, 195, 382/280; 375/240.12; H04N 7/12

(56) References Cited

U.S. PATENT DOCUMENTS

| | | | | |
|---|---|---|---|---|
| 5,859,660 | A * | 1/1999 | Perkins et al. ................. | 725/32 |
| 5,978,029 | A * | 11/1999 | Boice et al. ........... | 375/240.14 |
| 6,026,232 | A * | 2/2000 | Yogeshwar et al. ......... | 345/719 |
| 6,058,210 | A * | 5/2000 | de Queiroz et al. ........ | 382/232 |
| 6,301,428 | B1 * | 10/2001 | Linzer ......................... | 386/52 |
| 6,380,991 | B1 * | 4/2002 | Teichmer ............... | 375/240.01 |
| 6,381,278 | B1 * | 4/2002 | Shin et al. ............. | 375/240.16 |
| 6,449,392 | B1 * | 9/2002 | Divakaran et al. .......... | 382/235 |
| 6,473,459 | B1 * | 10/2002 | Sugano et al. ......... | 375/240.16 |
| 6,493,042 | B1 * | 12/2002 | Bozdagi et al. ............. | 348/700 |
| 6,618,507 | B1 * | 9/2003 | Divakaran et al. .......... | 382/236 |
| 6,741,290 | B1 * | 5/2004 | Wells .......................... | 348/512 |

OTHER PUBLICATIONS

J. Lee and B.W. Dickinson, "Scene-Adaptive Motion Interpolation Structures Based on Temporal Masking in Human Visual Perception", in Proc. SPIE Conf. Visual Communication and Image Processing, Cambridge, Nov. 1993, pp. 499-510.

J. Lee and B.W. Dickinson, "Adaptive Frame Type Selection for Low Bit-Rate Video Coding", in Proc. SPIE Conf. Visual Communication and Image Processing, Chicago, IL, Sep. 1994, pp. 1411-1422.

A.Y. Lan, A.G. Nguyen and J.N. Hwang, "Scene-Content-Dependent Reference-Frame Placement for MPEG Video Coding", IEEE Trans. Circuits and Systems Video Technol., vol. 9, No. 3, pp. 478-489, 1999.

A. Yoneyama, Y. Nakajima, H. Yanagihara and M. Sugano, "MPEG Encoding Algorithm with Scene Adaptive Dynamic GOP Structure", IEEE Third International Workshop on Multimedia Signal Processing, pp. 297-302, 1999.

* cited by examiner

Primary Examiner—Nhon Diep
(74) Attorney, Agent, or Firm—Beyer Weaver & Thomas LLP

(57) ABSTRACT

This invention discloses an intra-frame complexity based dynamic GOP system and method for the encoding of MPEG-2 video streams. The present invention may be used as a rate control tool to improve video quality. The selective insertion of low complexity I frames in scene changes such as fades is disclosed. It is disclosed that the selective use of I frames in certain scene change situations can improve encoder performance, particularly when encoding at a low bit rate.

20 Claims, 9 Drawing Sheets

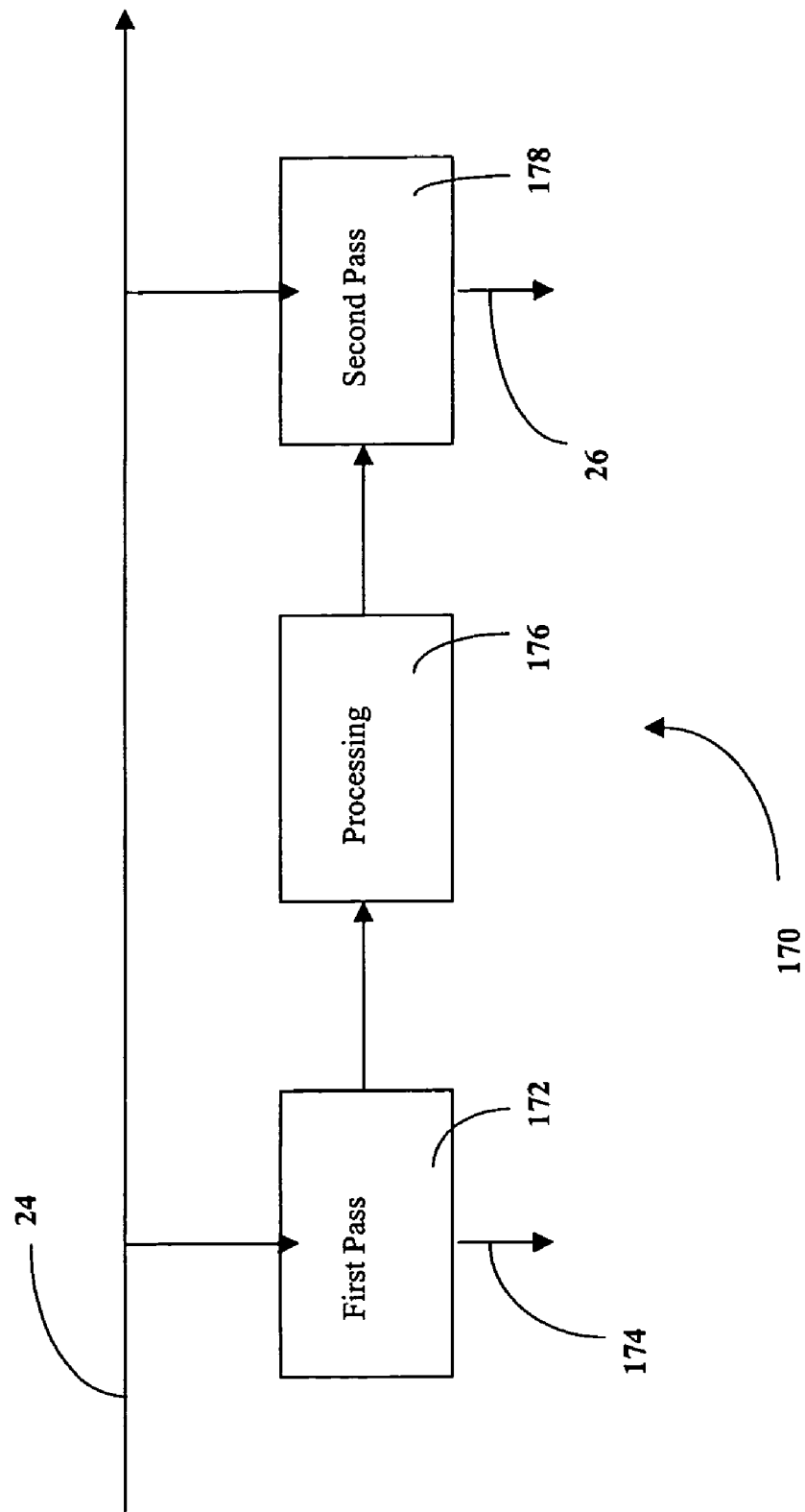

DYNAMIC GOP SYSTEM AND METHOD FOR DIGITAL VIDEO ENCODING

FIELD OF THE INVENTION

The present invention relates generally to systems and methods for the digital video encoding. More specifically the present invention relates to detecting scene changes to aid in dynamically creating Groups of Pictures.

BACKGROUND OF THE INVENTION

Throughout the specification and claims, we will be using the term MPEG (Motion Picture Expert Group). MPEG is a generic reference to a family of international standards, which define how to encode visual and audio information in a digital compressed format. MPEG is utilized in a wide variety of applications, including DVD (Digital Video Discs) and DVB (Digital Video Broadcasting).

A key feature of MPEG is that it can compress a video signal into a fraction of its original size. MPEG achieves a high compression for video by storing only the changes from one video frame to another, instead of each entire frame. This compression process is known as encoding and is done by an encoder. At the receiving end of an MPEG transmission, there exists a decoder, which decodes the transmission and restores it as best it can to the video signal originally encoded.

There are two major MPEG standards: MPEG-1 and MPEG-2. The most common implementations of the MPEG-1 standard provide video quality slightly below the quality of conventional VCR (Video Cassette Recorder) videos. MPEG-2 provides higher resolution, with full CD quality audio. This is sufficient for the major TV standards, including NTSC (National Standards Television Committee) and HDTV (High Definition Television).

Of the series of MPEG standards that describe and define the syntax for video broadcasting, the standard of relevance to the present invention is ISO/IEC IS 13818-2, ITU-T Recommendation H.262, titled "Generic coding of moving frames and associated audio information: Video," which is incorporated herein by reference and is hereinafter referred to as "the MPEG-2 standard".

An MPEG video transmission is essentially a series of pictures taken at closely spaced time intervals. Often a picture may be quite similar to the one that precedes it or the one that follows it. For example, video of waves washing up on a beach would change little from picture to picture. Except for the motion of the waves, the beach and sky would be largely the same. Once the scene changes, however, some or all similarity may be lost. The concept of compressing the data in each picture relies upon the fact that many images do not change significantly from picture to picture. Thus, considerable savings in data transmission can be made by transmitting only the differences between pictures, as opposed to the entire picture. In the MPEG-2 standard a picture is referred to as a "frame". This is terminology we will use from now on.

Since the MPEG-2 standard specifies only bitstream syntax for compressed video, a number of methods have been proposed to improve the picture quality of compressed digital video produced by a video encoder. Among the most effective of these are the following:

1) Pre-filtering
2) Bitrate allocation based on the human visual system
3) Rate-distortion optimal motion vector search and mode-decisions
4) Two-step encoding with a look-ahead buffer for accurate rate-control, buffer management, and smoothing of CBR video quality.
5) Dynamic GOP (Group of Picture) control This invention addresses an improved method and system relating to item 5).

SUMMARY OF THE INVENTION

The present invention is directed to an MPEG video encoder, the encoder having:
  a) means for analyzing statistics from a video stream;
  b) means connected to said means for analyzing statistics, for determining if a scene change has occurred; and
  c) means to create a modified video stream if a scene change has occurred.

The present invention is also directed to a method for creating a modified video stream, the method analyzing the frames of an input video stream to determine if a scene cut, dissolve or fade has occurred.

The present invention is further directed to a computer readable medium containing instructions for creating a modified video stream, the instructions analyzing the frames of an input video stream to determine if a scene cut, dissolve or fade has occurred.

The present invention is further directed to a method for improving encoder performance, the method determining if a fade has occurred in a video stream, if a fade has occurred, modifying the video stream by selecting a frame with the lowest complexity in the fade as an I frame in the video stream.

The present invention is further directed to a system for improving encoder performance, the system having detection means to determine if a fade has occurred in a video stream, if a fade has occurred, utilizing modification means to select a frame with the lowest complexity in the fade as an I frame in the video stream.

The present invention is also directed to an MPEG video encoder, the encoder having:
  a) a statistical analysis module for analyzing statistics from a video stream;
  b) a scene change analysis module connected to said statistical analysis module for determining if a scene change has occurred; and
  c) a modification module to create a modified video stream if a scene change has occurred.

BRIEF DESCRIPTION OF THE DRAWINGS

For a better understanding of the present invention, and to show more clearly how it may be carried into effect, reference will now be made, by way of example, to the accompanying drawings which aid in understanding an embodiment of the present invention and in which:

FIG. 6 is a schematic diagram of a dual pass encoding system.

DETAILED DESCRIPTION OF THE PREFERRED EMBODIMENTS

The transmission and reception of digital video requires complex hardware and software components. It is not the intent of this disclosure to address all such components but rather to address the specific areas within a digital video system in which the present invention may be utilized.

Figure 1:
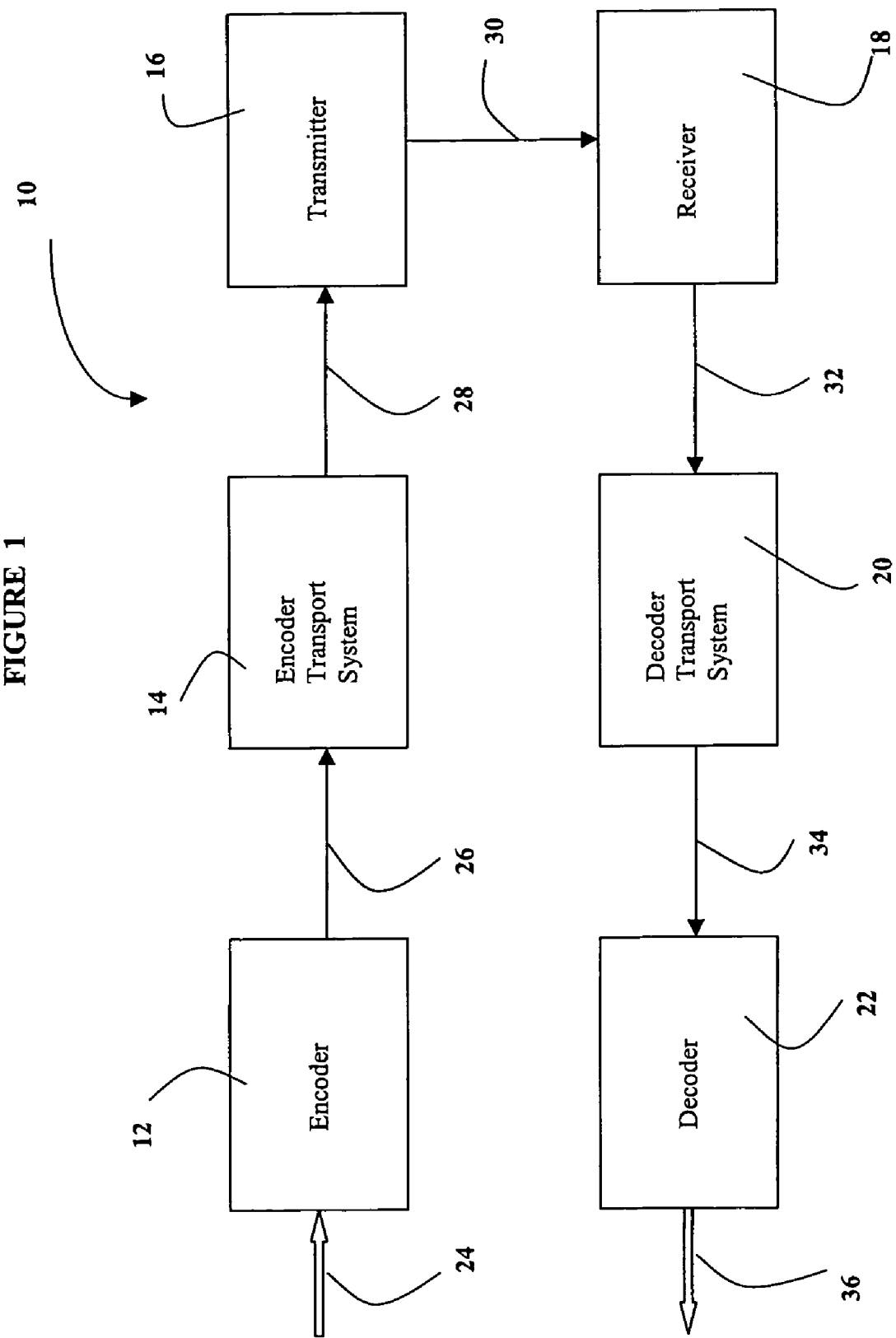
FIG. 1 is a block diagram of a generic digital video system.

By way of introduction we refer first to FIG. 1, a generic digital video system, is shown generally as 10. FIG. 1 is an overview of a generic system 10 in which the present invention may be utilized. System 10 comprises encoder 12, encoder transport system 14, transmitter 16, receiver 18, decoder transport system 20 and decoder 22. Encoder 12 accepts as input, source video stream 24. Source video stream 24 may come from a plurality of sources, but for the purpose of simplicity the reader may think of source video stream 24 as coming from analog sources such as a television transmission. Encoder 12 receives source video stream 24 and through the utilization of any number of compression algorithms translates source video stream 24 into an elementary video stream 26. The discussion of the structure of an elementary video stream and other details of MPEG-2 structure is beyond the scope of this disclosure. The structural details are defined in the MPEG-2 standard.

Encoder transport system 14 receives video stream 26 and further restructures video stream 26 into transport packet stream 28. The details of the structure of transport packets are provided in the MPEG-2 standard. Stream 28 is then passed to a transmitter 16, which in turn forwards stream 28 to receiver 18 via a communications channel 30. Communications channel 30 may take on a variety of forms such as, wireless or cable or any other form of transmitting data. Receiver 18 receives the data transmitted by communication channel 30 and in turn passes it in the form of a second transport packet stream 32. In a perfect world, stream 28 and stream 32 will be identical. Decoder transport system 20 receives stream 32 and produces a second elementary video stream 34. Once again, in a perfect world, stream 26 and stream 34 would be identical. Decoder 22 accepts stream 34 and outputs reconstructed video stream 36.

The present invention is utilized within encoder 12. To better understand the present invention, we will provide a brief and simplistic overview of how digital images are compressed.

The MPEG-2 standards address many of the important issues relating to the exploitation of redundancies in video. Spatial, temporal and coding redundancies are all taken advantage of in the algorithms utilized to encode an MPEG-2 stream. Spatial redundancy occurs when picture elements (Pixels) in one frame are replicated in one or more succeeding frames. Temporal redundancy occurs when successive frames display images of the same scene. Coding redundancy is the encoding of spatial or temporal redundancies.

There are two basic forms of compression for a frame in a video stream, interframe and intraframe. Interframe compresses data based upon similarities between frames (thus "inter"), while intraframe compresses data based upon similarity within a region of a single frame (thus "intra"). A frame may be Intra (I), predictive (P) or Bi-directionally-predictive (B).

An I frame is coded in isolation from other frames, thus it is coded using information only from itself. I frames contain data to construct an entire frame. An I frame is often used to efficiently code frames corresponding to scene changes, i.e. frames that are different from preceding frames and cannot be easily predicted.

A P frame contains only predictive information (i.e. not an entire frame) generated by looking at the difference between the present frame and the previous one.

B frames are created by examining the difference between the previous frame and the next frame in a sequence of frames.

Both B frames, and P frames do not contain all the information necessary to view the frame until it is decoded within the context in which it appears. As they only contain predictive information, they do not make up a complete frame and so have the advantage of taking up much less data than an I frame.

Frames between two successive I frames, including the leading I frame, are collectively called a group of pictures (GOP). This is the set of frames, which provide the context for the use of B and P frames.

Figure 2:
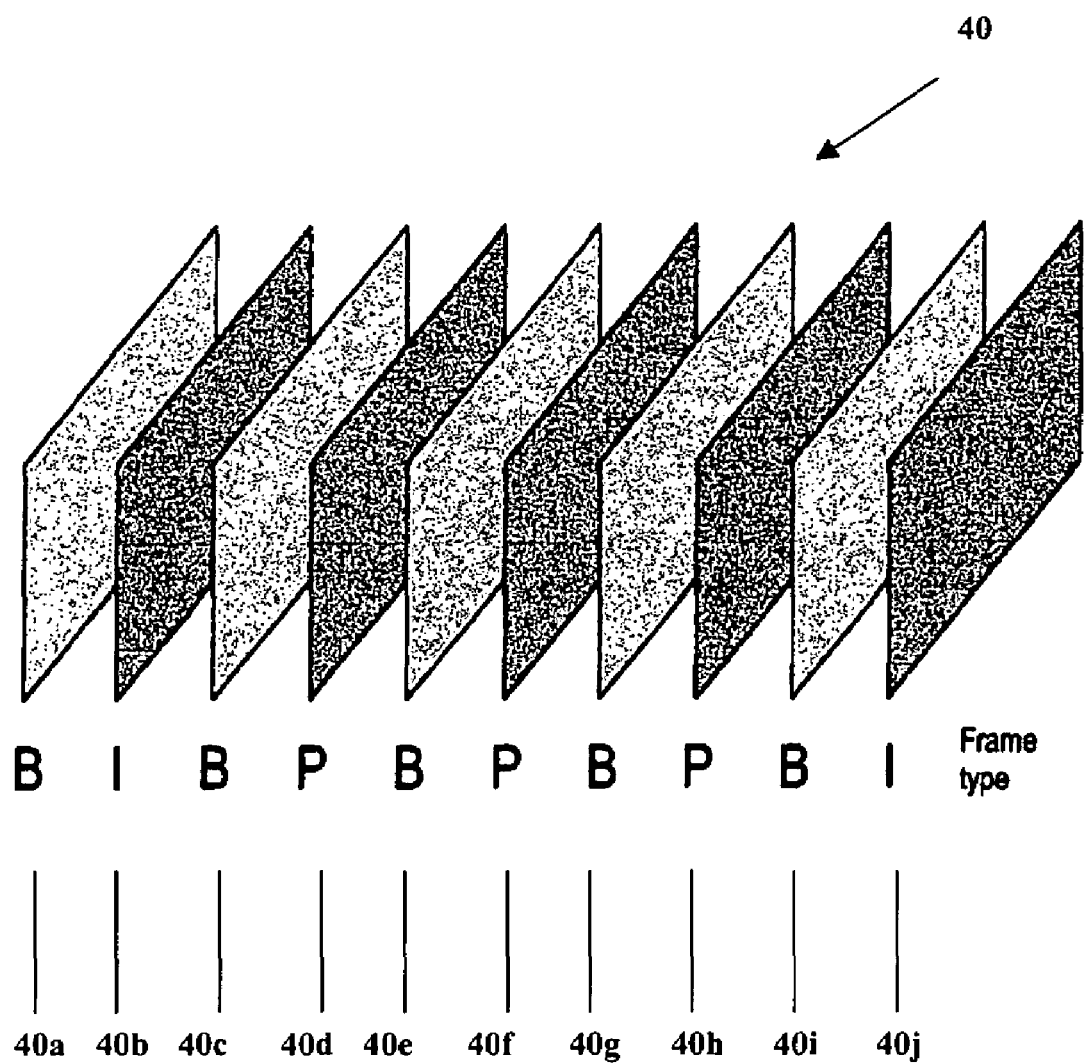
FIG. 2 is a schematic diagram of a group of frames in an MPEG video sequence.

FIG. 2 is a schematic diagram of a group of frames in an MPEG video sequence, shown generally as 40. Frames 40a to 40j are of different types, namely I, P and B. Frames 40a to 40j are shown in the order in which they would be displayed to a user. However, due to the requirement that P and B frames require information from other frames, the transmission order is actually: 40b, 40a, 40d, 40c, 40f, 40e, 40h, 40g, 40j (which together form a GOP) and 40i. For example, frame 40i being a bi-directional frame cannot be transmitted until the differences in frames 40h and 40j have identified.

To aid the reader in understanding the use of different frames, imagine we are looking at waves wash up on the beach from a stationary camera and the sky has only motionless clouds. The only thing that is moving is the waves. In such a scene, encoder 12 (see FIG. 1) would create an I frame, which is transmitted to decoder 22. Decoder 22 passes the image on to video stream 36 whereupon it is displayed to a user. Decoder 22 retains a copy of the information contained in that image. Next, encoder 12 generates a P-frame based on the motion of the waves. It generates a frame that has the identical background of the proceeding I frame. The waves have moved a little. Encoder 12, using complex mathematics, compares the image it has predicted with the actual image. Encoder 12 then transmits data that represents this comparison, not the entire image. Decoder 22 utilizes the same complex mathematics. For decoder 22 to determine what the next frame should look like, it only needs to know the error between the prediction and the actual image to recreate the P frame.

Should the scene change to a close up of a surfer on the beach, the image will have changed completely. This throws off the prediction process and requires an entirely new image, thus the process starts again.

A fixed GOP structure is a commonly used method for encoding frames. A fixed GOP structure is one in which a fixed pattern of frames are used or in which a fixed number of frames are used to form a GOP. Encoding in this manner reduces complexity but does not allow for changing temporal statistics. Temporal statistics include frame mode such as I, B or P and GOP length. Since video sequences have variable scene durations, depending on the content, it is not always possible to use a fixed GOP structure to efficiently code a video sequence. This is because the position of I frames in the sequence depends on when scene changes occur. The present invention provides a mechanism to efficiently decide when to code a frame as an I frame and when to code a frame as P or B frame, namely mode decision.

The basic building block of an MPEG frame is a macroblock. A macroblock consists of a 16×16 array of luminance (grayscale) pixels together with two 8×8 blocks for chrominance (color) pixels. It is not the intent of this disclosure to discuss the technical details of the information in a macroblock as it is well known to those skilled in the art and well defined in the MPEG-2 standard. At the introductory level, one may consider a macroblock to be a digital equivalent of a portion of the analog RGB (red, green, blue) information transmitted by source video stream 24, before that signal is encoded to become video stream 26.

The MPEG-2 standard allows for macroblocks in a P frame to be intra coded if they can not be predicted efficiently. This means that even if all the frame types are set to be P, there may be many macroblocks in each frame that are intra coded. This macroblock based mode decision may be used to account for scene changes. However coding a P frame is more computationally expensive than coding an I frame. This is because coding P frames uses motion estimation and compensation and also the additional decision for each macroblock in the frame. Hence making the decision at the frame level to code a frame as an I frame is more efficient in terms of computation.

Video can be further compressed by taking advantage of scenes where the information used to determine if a scene change has occurred allows for larger interreference frame distances (i.e. larger GOP and dynamic GOP). The additional compression over the fixed picture arrangement style comes from the reduction in the number of reference frames (i.e. B and P frames) which require more bits in order to provide high quality prediction.

Dynamic GOP coding requires sensitivity to different types of scene changes such as scene cut, dissolves and fades. Intuitively, high motion requires more frequent placement of reference P frames to uphold quality. Low motion, on the other hand, allows larger distances between P frames since the correlation remains high over a larger span of frames. The frames in between P frames are coded as B frames. Scene cuts or scene changes require prediction dependencies to be reset to I frames as the next frame cannot be predicted.

The present invention utilizes dynamic GOP generation based on video content to improve the video quality.

Traditional use of dynamic GOP generation makes use of two steps, namely:

a) scene change detection, to detect changes such as scene cut, dissolve or fade; and b) mode decision strategy such as GOP size and when I, B or P frames should be used.

We will now discuss each of these in turn followed by a description of the implementation of the present invention.

1.0 Scene Change Detection

Figure 3A:
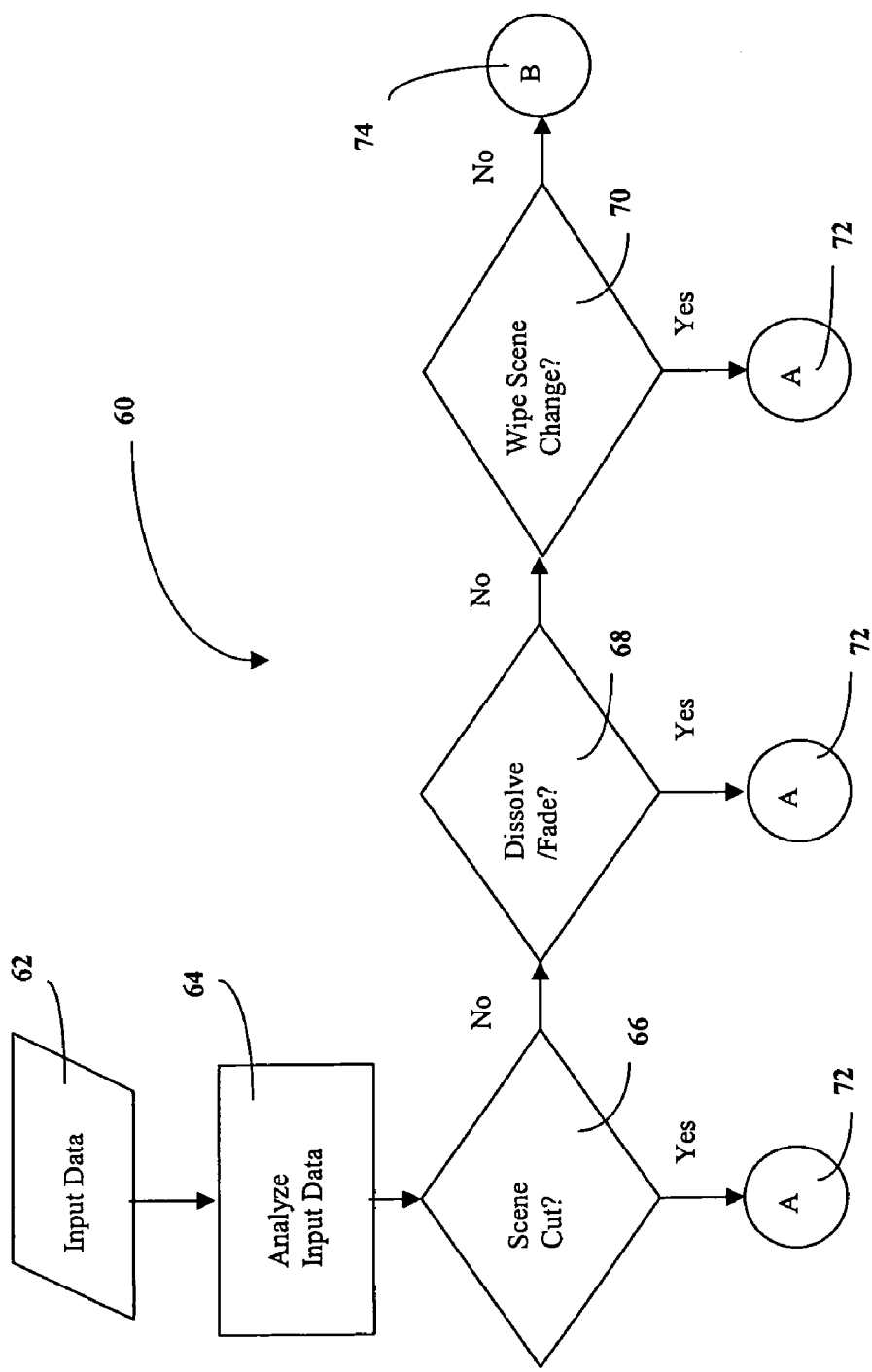
FIGS. 3a and 3b comprise a logical flowchart of a scene change detection algorithm.

There is a large amount of literature regarding scene change detection. It is not our intent to explore the prior art in great detail, however we will provide some introductory material. In doing so, we refer now to FIGS. 3a and 3b where a logical flowchart of a scene change detection algorithm is shown generally as 60. Algorithm 60 utilizes input data 62 at analysis step 64 to determine if a scene change has occurred. Analysis step 64 may make use of a number of comparisons utilizing input data 62, some of the most common being:

a) pixel comparison;

b) histogram comparison; and c) DC images comparison.

Pixel comparison evaluates the differences in intensity or color values of corresponding pixels in two successive frames. The simplest method is to calculate the absolute sum of the pixel differences and compare it against a threshold. A scene cut is detected if the difference is above the threshold.

Histogram comparison compares the gray level histograms of the two frames. Two frames with not much difference in their background and some amount of object motion have almost the same histograms. The histogram for a frame is obtained by summing the number of pixels belonging to each gray level in the frame. If difference between each frame is greater than the given threshold then a scene cut is detected. A similar scheme is available for color.

DC images comparison utilizes DC images in the same manner as Pixel or Histogram comparison to detect scene changes. DC images are spatially reduced versions of the original images.

Figure 3B:
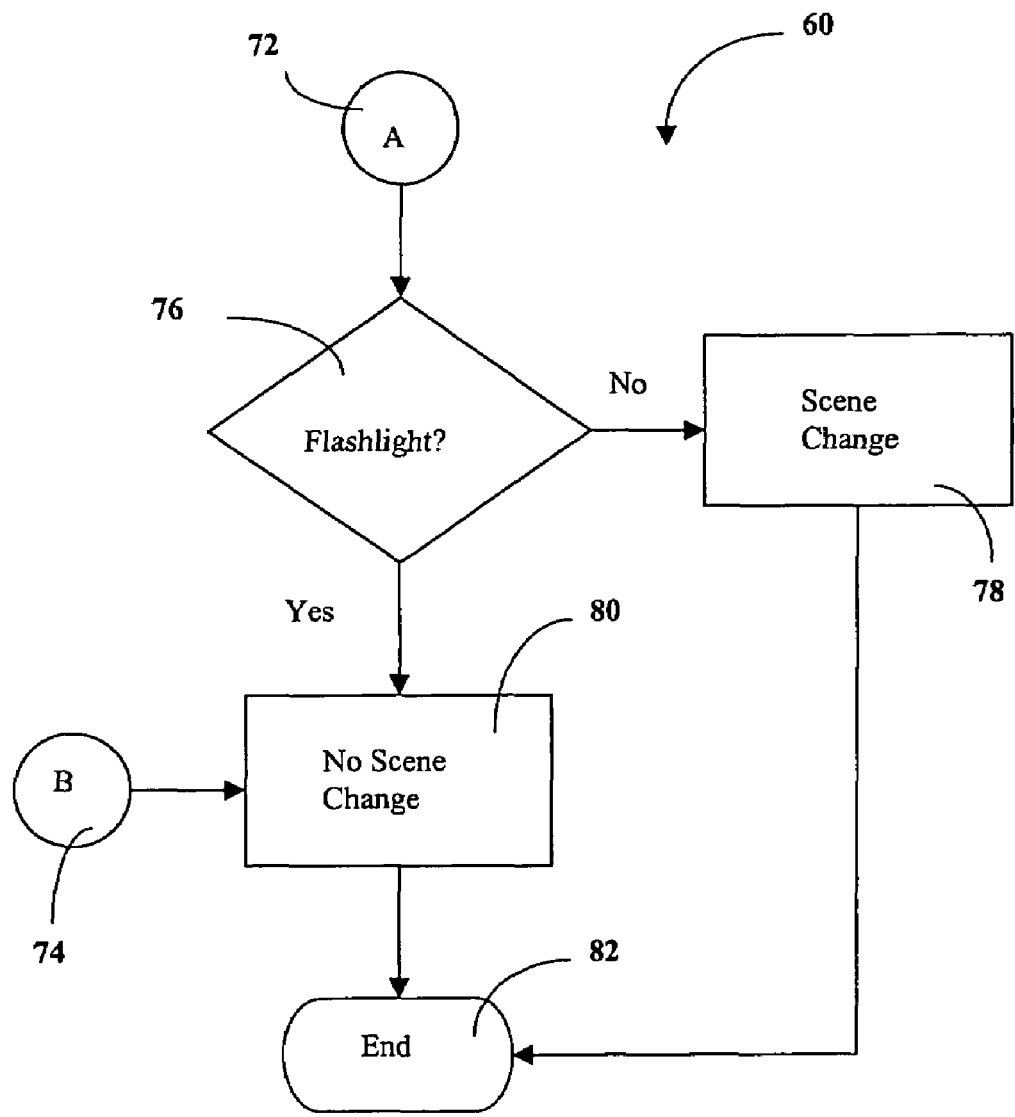

After the input data has been analyzed at step 64, a test is made at step 66 to determine if a scene cut has occurred. A scene cut is a sudden change in a scene. If a scene cut has been made, processing moves to step 72 (FIG. 3b). Otherwise processing moves to step 68 where a test is made to determine if a dissolve or fade has occurred. A dissolve occurs when one scene gradually disappears while another appears. A fade is a scene gradually disappearing or appearing. If a dissolve or fade is detected then processing moves to step 72 (FIG. 3b). Otherwise processing moves to step 70 where a test is made to determine if a wipe scene change has occurred. A wipe is where one scene gradually enters the view while another gradually leaves. If a wipe is detected processing moves to step 72 (FIG. 3b). Otherwise processing moves to step 74.

Step 72 passes control to step 76 where a test is made to determine if a flashlight has occurred. A flashlight is a term used in the art to describe a scene where an individual is in front of a number of cameras, with numerous flash photographs being taken. If a flashlight has occurred then processing moves to step 80 which indicates no scene change has been detected. If a flashlight has not occurred than processing moves to step 78 which indicates a scene change has been made. Process 60 then moves from step 78 to the end at 82. Returning now to step 80 this is point where the positive test from step 76 and the transition step 74 meet, at this step no scene change has been detected. From step 80 processing ends at step 82.

2.0 Mode Decision

The MPEG-2 standard allows for different kinds of coding modes for frames. By this we mean the types of frames coded, their order and the size of a GOP. Mode decisions involve choosing between different courses of action or modes to improve the performance of the video coding. Examples of mode decisions are: setting GOP size, and determining when I, P or B frames should be inserted. There are many mode decisions in the encoding process and these may be at different coding level. For instance some mode decisions are made frame by frame while others are made on a block by block basis. Each of these different mode decisions has a cost associated with it. This cost may be defined in terms of the bits, the time needed, the quality, or a combination of some of these. So the mode decision involves choosing the mode that has a smaller cost associated with it.

In principle, to make the optimal decision one can try all the modes and choose the mode that has the lowest cost.

However, computing the actual costs before making a decision is very computationally intensive as this involves trying every mode to determine the cost.

It is also well known that implementations of the MPEG-2 standard perform very poorly during fade-to-black (or gray) and fade-from-black (or gray). This is because motion compensation performs very poorly during this frequently used video effect. Unfortunately, television programs such as music video channels use this video effect extremely often (as often as once every couple of GOP). This results in very poor quality for Continuous Broadcast Rate (CBR) video at low-bitrates.

3.0 Intra-frame Complexity based dynamic GOP

The present invention makes use of a new dynamic GOP method and system that identifies the preferred locations for I frames as not only at the start of new scenes, but also on the lowest complexity frames (requiring the fewest bits to encode as an I frame). This is done when an I frame must be placed to maintain a reasonably low dynamic access time. For example, for sequences with frequent long fades, there is an attempt made to place I frames that are required for a random access on the 'black' frames in the middle of the fade, which require very few bits to code. Additional I frames are placed between these 'preferred locations' as required to satisfy the minimum random access of the stream. Rapid random access to I frames is required in the situation where decoder 22 gets out of synch with the video stream being decoded and must access an I frame to reset the stream.

Figure 4A:
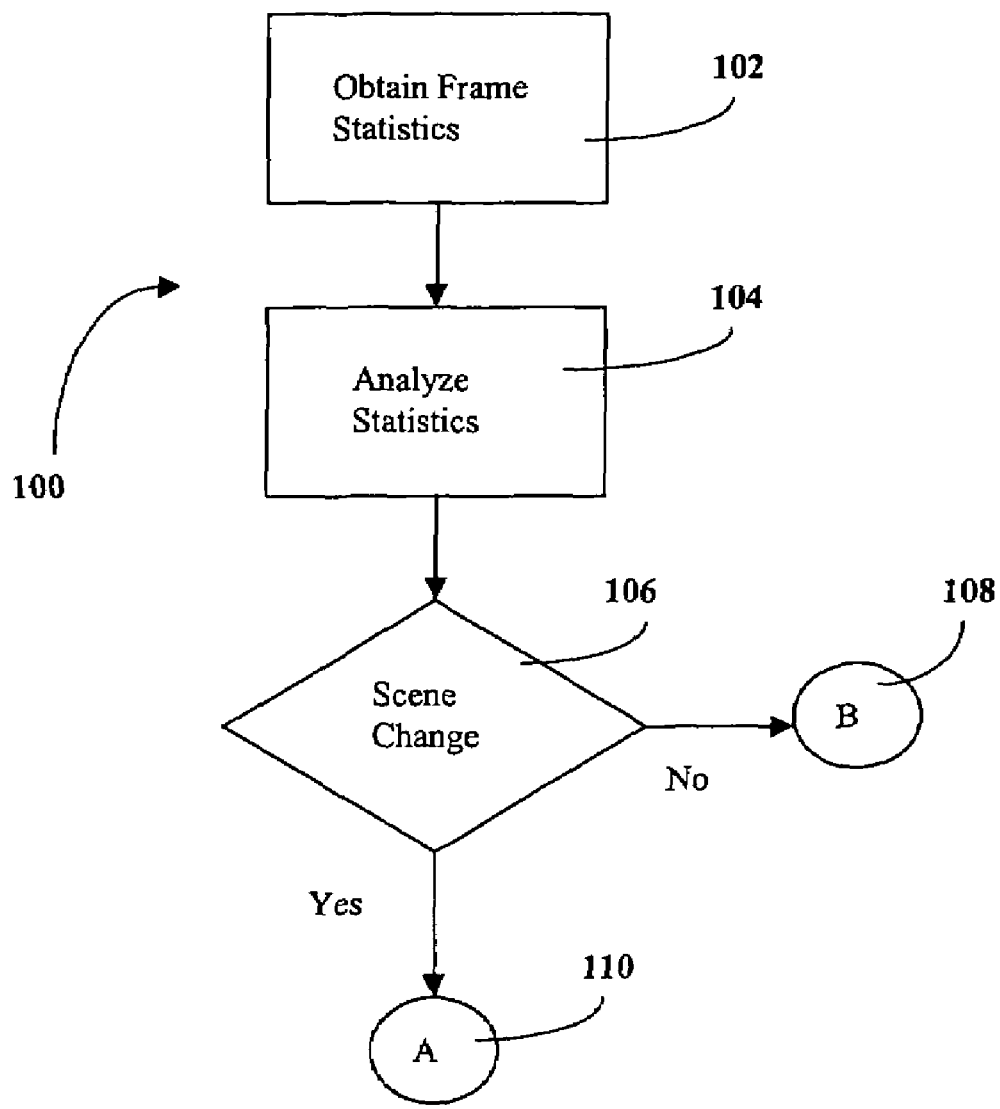
FIGS. 4a and 4b comprise a logical flowchart of a dynamic GOP algorithm.
Figure 4B:
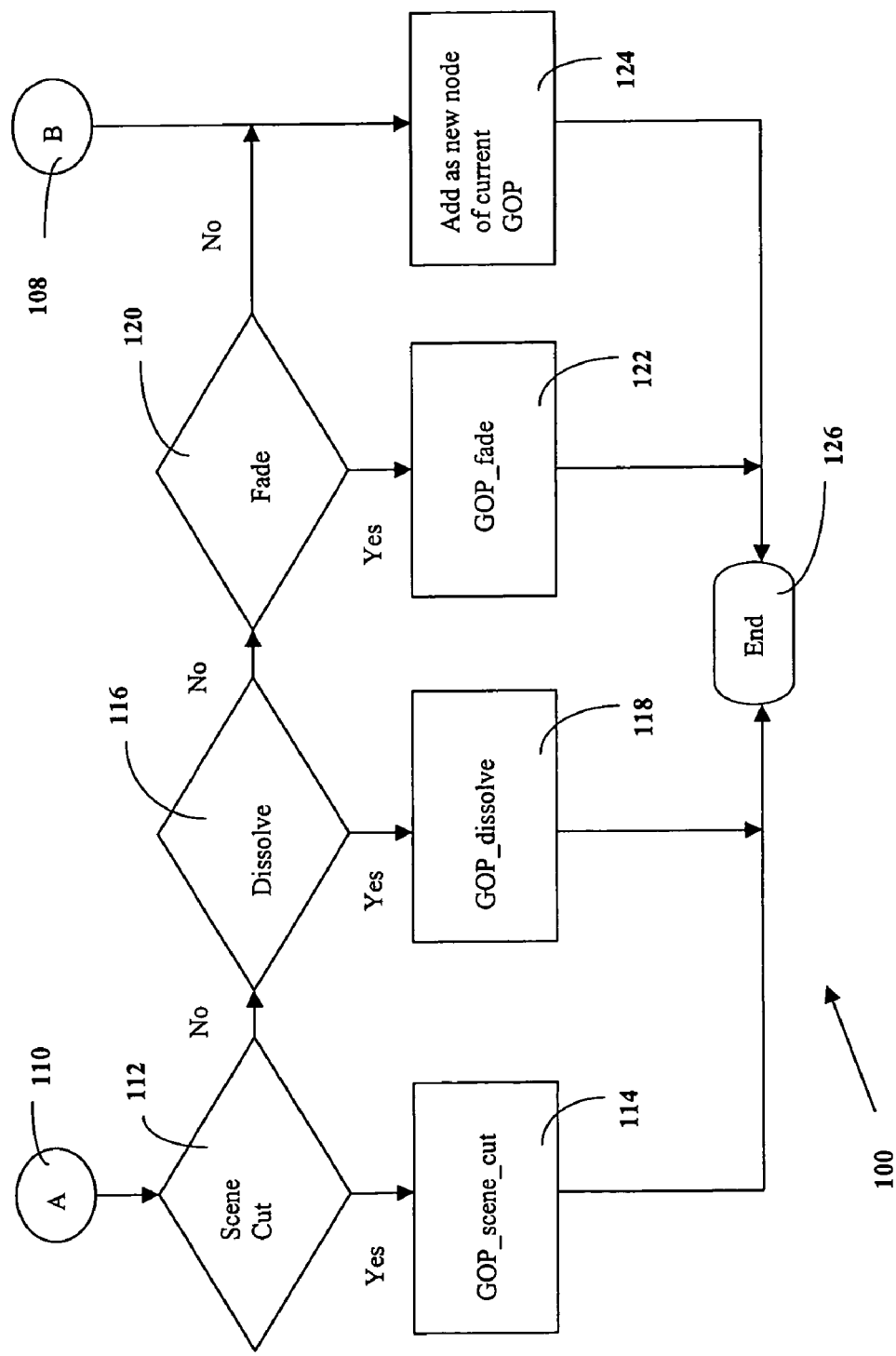

Referring now to FIGS. 4a and 4b, a logical flowchart of a dynamic GOP algorithm of the present invention is shown generally as 100.

Beginning at step 102 frame statistical data is obtained regarding the current frame, this includes information such as the number of bits in the encoded frame and quantisation values for each macroblock in the frame as well as various data required to determine if a scene change has occurred.

At step 104 the global complexity of the frame is calculated. The present invention utilizes the complexity definition of the MPEG Test Model 5 (TM5) model directly, namely the global complexity of each frame is defined as:

$$X_x = S_x \times Q_x$$

Where $S_x$ is the number of bits generated by encoding the frame and $Q_x$ is the average quantisation parameter computed by averaging the actual quantisation values used during the encoding of the all the macroblocks, including the skipped macroblocks in the frame. The frame x may be type of I, P or B.

Scene change analysis is also performed at step 104. As mentioned above in section 1.0, scene changes may be detected in a variety of ways.

Moving to step 106 a test is made to determine if a scene change has occurred. If not, processing moves to step 108 otherwise to step 110. Since no scene change was made, step 108 moves to step 124 (FIG. 4b) where the current frame is added as a new frame in the GOP and the process ends at step 126.

Step 110 moves to step 112 where a test is made to determine if the scene change is a scene cut. If a scene cut is detected, the current frame is the first frame of a new scene. This situation is handled by coding the current frame as an I frame and the previous frame as a P-frame to reset the prediction dependencies. Coding the previous frame as a B-picture would allow the old scene to reference the new scene, which should be forbidden since the content is completely different. Process 100 then completes at step 126. If there has been no scene cut detected, processing moves to step 116.

At step 116 a test is made to determine if a dissolve has been detected. If a dissolve is detected, processing moves to step 118 and the current frame is encoded as a B frame instead of a P or I frame. This is done because a dissolve frame is generated by the previous frame and next frame. In the case of using a dual pass encoder (see FIG. 6) this may result in a change of the previous GOP structure. Process 100 then completes at step 126. If there has been no dissolve detected, processing moves to step 120.

At step 120 a test is made to determine if a fade has been detected, a frame (within the fades) with the lowest complexity is chosen as an I frame.

As one skilled in the art can appreciate process 100 is repeated by encoder 12 for each frame in source video stream 24.

Put simply, the present invention:

a) places lowest complexity I frames into the GOP during fades; and b) treats different types of scene changes differently.

This is a different method from the traditional "scene cut" preferred I frame location, which is immediately after the scene change. The intent of the traditional method is to achieve good prediction for the new scene. The traditional method has been widely used and is frequently reported in literature relating to scene changes.

During fades, I frames are ineffective for use in predicting, so they would normally be avoided if not for the practical requirement of minimum access time.

The same strategy can be used whenever motion compensation breaks down, for example, I frames could be placed as far away as possible from fast zooms and other video effects. However, extremely low-complexity frames (such as black frames with fades) which are preferred locations on which to place the required I frames, are not always consistently available during video effects, so the effectiveness of this strategy is reduced.

Figure 5A:
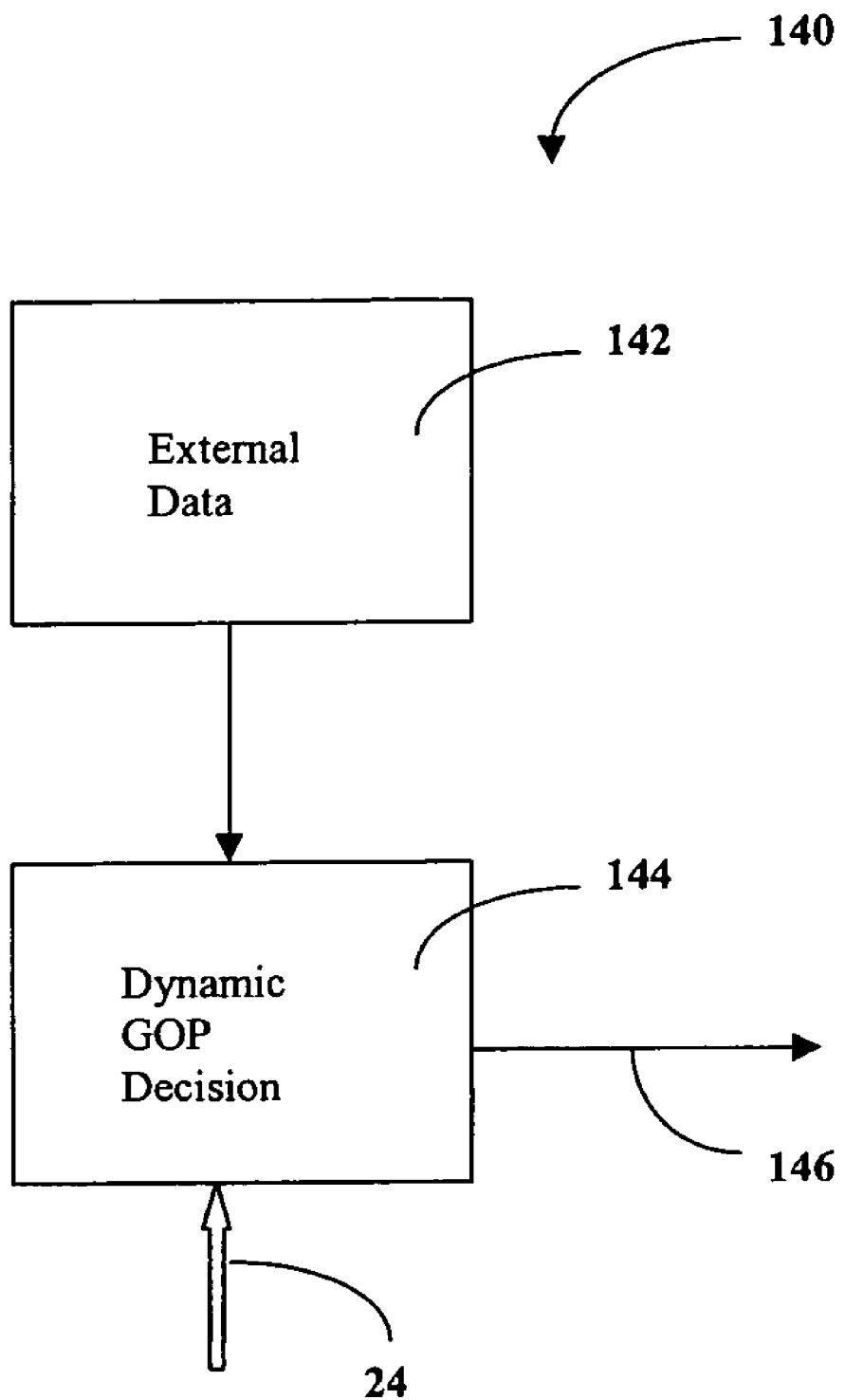
FIGS. 5a and 5b comprise a block diagram illustrating a dynamic GOP system connected to an encoder.

Referring now FIG. 5a, a block diagram illustrating a dynamic GOP system connected to an encoder is shown generally as 140. External data 142 comprises statistical information on the video stream being encoded and is provided as input to dynamic GOP decision module 144. Module 144 makes use of the same logic described with regard to FIGS. 4a and 4b to determine when a GOP should be modified based upon detected scene changes. Source video stream 24 is the source video stream 24 of FIG. 1. Thus the components of FIG. 5a sit in front of encoder 12 to modify source video stream 24 as required to implement the present invention.

Figure 5B:
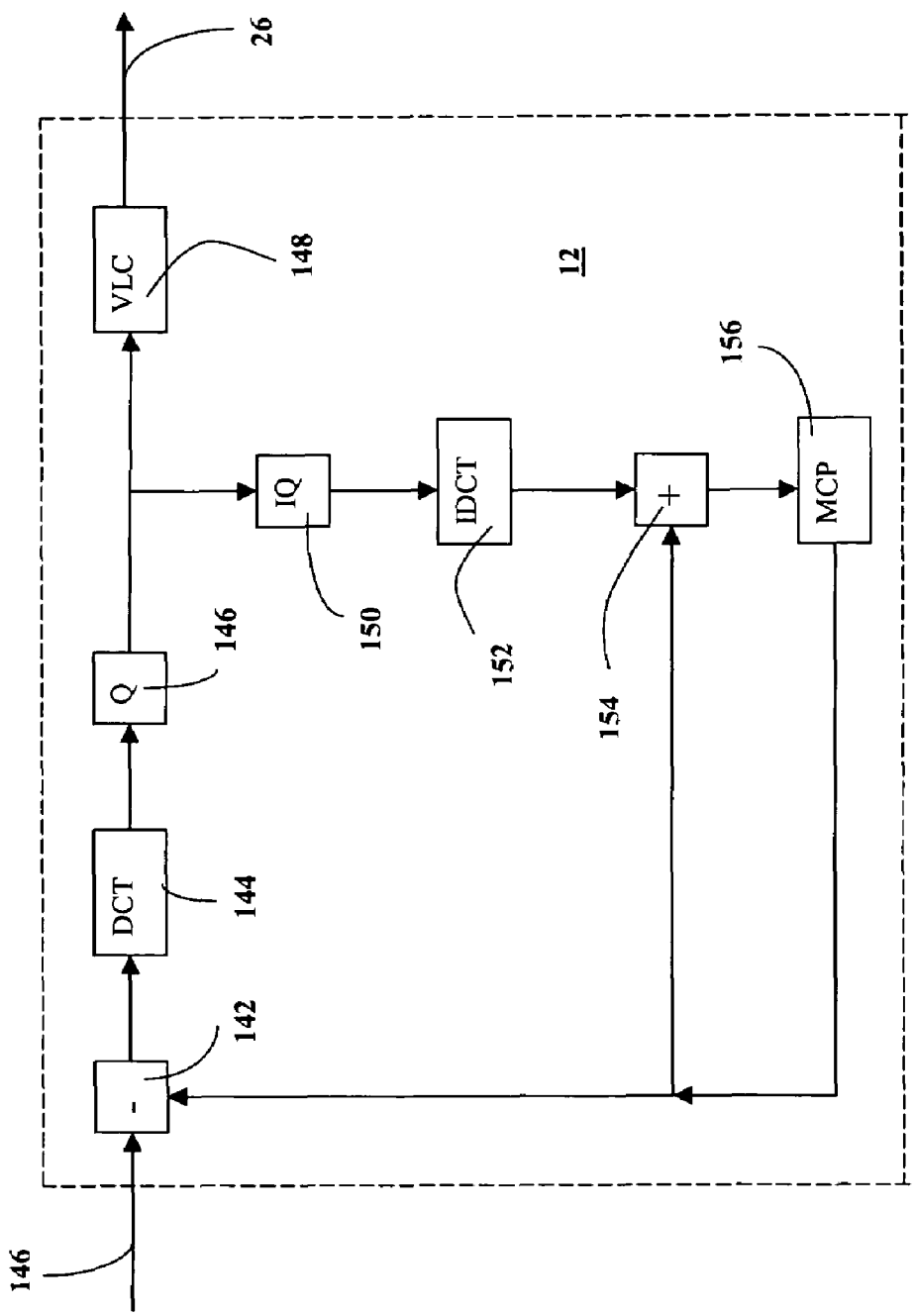

Referring now to FIG. 5b, encoder 12 accepts reformatted video stream 146 from module 140. Reformatted video stream 146 is input to module 142, which subtracts motion compensated prediction from a frame to form a "prediction error" frame. The prediction error frame is passed to Discrete Cosine Transform module 144, which transforms the frame and passes it to Quantiser module 146. Quantiser module 146 quantises the coefficients produced by module 144 and creates a new frame. The new frame may have to be recalculated based upon prediction error, thus the reason for the loop comprising blocks 150, 152, 154 and 156.

Once the frame has been successfully encoded it is passed to Variable Length Coder module 148. Module 148 then transmits elementary video stream 26 to encoder transport system 14 (FIG. 1).

With regard to the above description of FIG. 5b, it is not the intent of the inventors to describe in detail the functionality of the modules shown. The functionality expected of such modules is defined in the MPEG-2 standard and numerous variations within both the modules and the structure of encoder 12 are well known to those skilled in the art. FIG. 5b is simply meant to illustrate an instance where the present invention may be utilized with a specific encoder design.

Referring now to FIG. 6 a schematic diagram of a dual pass encoding system utilizing the present invention is shown generally as 170. Source video stream 24 is input to first pass encoder 172 under conventional CBR control. First pass encoder 172 outputs a conventional CBR stream 174 for use by components outside the system such as an MPEG-2 multiplexer. First pass encoder 172 also outputs certain statistics of the input video data, such as frame mode, GOP length, bits used per frame, bit rate, and quantisation information. In some situations first pass encoder may provide direct information on a scene change. These statistics are next processed by processing module 176. The processing done by module 176 is done off-line, as it does not require the video data, rather only the statistics. The task of processing module 176 is to compute the parameter settings for the second pass encoder 178. Using the parameters provided by module 176 and source video stream 24, second pass encoder 178 is run to produce output video stream 26.

By way of example, the present invention may be implemented using two IBM MPEG-2 S series encoder chips such as S420 or S422. In this example one encoder would act as the first pass encoder 172 and the second as the second pass encoder 178. Utilizing such an encoding system, first pass encoder 172 yields numerous statistics such as: scene change indicator, frame activity (i.e. variance from the original frame as described in TM5), actual bits for the current frame, the average quantisation parameters for the current frame, and the video quality indicator (which refers to the error between the reconstructed frame and the original frame). Based upon this information it is possible to calculate frame complexity using the formula discussed earlier. Knowing the value of frame activity and given a scene change indicator, the present invention could distinguish a fade from several scene cuts in a row. When several scene change indicators occur in a sequence, if the frame activities are close to each other, than a fade has occurred otherwise there are several scene cuts. Also by knowing the frame complexity, activity and quality indicator it is possible to locate the black frame inside a fade. This frame typically has the lowest frame complexity, lowest frame activity and highest video quality indicator.

When module 176 locates a fade in the video sequence, it can generate new GOP parameters for the second pass encoder 178, by treating the lowest complexity frame as an I frame.

The present invention is able to reduce the impact of the large number of bits required for I frames when encoding video at a very low bit rate, especially for sequences with frequent fades, which are often very difficult to encode at high quality, given a low bit rate.

Although excellent "fade-to/from black" detection is possible by observing mean frame luminance and variance, many commercially encoded video streams do not currently use effective fade detectors. As a result, they identify fades as multiple scene changes and place far too many I frames during fades. This results in poor quality at low bit rates. A first step towards improved quality is to properly identify a fade and suppress excess I frames. This substantially improves quality at low bit rates.

The present invention goes beyond suppressing I frames to determine an optimal placement of I frames during fades using frame complexity.

Although the invention has been described with reference to certain specific embodiments, various modifications thereof will be apparent to those skilled in the art without departing from the spirit and scope of the invention as outlined in the claims appended hereto.

We claim:

1. An MPEG video encoder, said encoder comprising:
   a) means for analyzing statistics from a video stream;
   b) means for analyzing statistics, for determining if a scene change has occurred; and
   c) means for creating a modified video stream, wherein a frame with low complexity is selected as an I frame in the modified video stream if the scene change is a fade.

2. The encoder of claim 1 wherein said means for analyzing statistics further comprises means for calculating the global complexity of a current frame within said video stream.

3. The encoder of claim 2, wherein the means for creating a modified video stream codes said current frame as an I frame and codes the frame previous to said current frame as a P frame in said modified video stream, if a scene change has occurred and if said scene change is a scene cut.

4. The encoder of claim 2, wherein the means to create a modified video stream codes said current frame as a B frame in said modified video stream if a scene change has occurred and said scene change is a dissolve.

5. The encoder of claim 2, wherein the means to create a modified video stream codes a frame with the lowest complexity in a fade as a I frame in said modified video stream if a scene change has occurred and said scene change is a fade.

6. A method for creating a modified video stream, the method comprising:
   analyzing a video stream comprising a plurality of I, B, and P frames;
   determining when a scene change has occurred;
   creating a modified video steam, wherein a frame with low complexity is selected as an I frame in the modified video stream if the scene change is a fade.

7. The method of claim 6 wherein if a scene cut has occurred, at a current frame, coding said current frame as an I frame and coding the frame previous to said current frame as P frame in said modified video stream.

8. The method of claim 6 wherein if a dissolve has occurred, at a current frame, coding said current frame as a B frame in said modified video stream.

9. The method of claim 6 wherein if a fade has occurred, selecting a frame with low complexity in the fade as an I frame in said modified video stream.

10. A computer readable medium including instructions for creating a modified video stream, said instructions comprising:
    computer code for analyzing the frames of an input video stream to determine when a scene change has occurred;
    computer code for creating a modified video stream, wherein a frame with low complexity is selected as an I frame in the modified video stream if the scene change is a fade.

11. The medium of claim 10 wherein if a scene cut has occurred at a current frame, coding said current frame as an I frame and the frame previous to said current frame as a P frame, in said modified video stream.

12. The medium of claim 11 wherein if a dissolve has occurred at a current frame, coding said current frame as a B frame in said modified video stream.

13. The medium of claim 12 wherein if a fade has occurred, selecting a frame with the lowest-complexity in the fade as an I frame in said modified video stream.

14. A method for improving encoder performance, said method determining if a fade has occurred in a video stream, if a fade has occurred, modifying said video stream by selecting a frame with the lowest complexity in the fade as an I frame in said video stream.

15. A system for improving encoder performance, said system having detection means to determine if a fade has occurred in a video stream, if a fade has occurred, utilizing means to select a frame with low complexity in the fade as an I frame in said video stream.

16. An MPEG video encoder, said encoder comprising:
   a) a statistical analysis module for analyzing statistics from a video stream;
   b) a scene change analysis module connected to said statistical analysis module for determining if a scene change has occurred; and
   c) a modification module to create a modified video stream, wherein a frame with low complexity is selected as an I frame in the modified video stream if the scene change is a fade.

17. The encoder of claim 16 wherein said statistical analysis module calculates the global complexity of a current frame within said video stream.

18. The encoder of claim 17, wherein said modification module codes said current frame as an I frame and codes the frame previous to said current frame as P frame in said modified video steam, if a scene change has occurred and if the scene change is a cut.

19. The encoder of claim 17, wherein said modification module codes said cent frame as a B frame in said modified video stream, if a scene change has occurred and if the scene change is a dissolve.

20. The encoder of claim 17, wherein said modification module codes a frame with the lowest complexity in a fade as an I frame in said modified video stream, if a scene change has occurred and if the scene change is a fade.

* * * * *